(12) United States Patent
Broome et al.

(10) Patent No.: US 10,958,759 B2
(45) Date of Patent: *Mar. 23, 2021

(54) RESOURCE REQUEST MANAGEMENT USING BANDWIDTH ALLOCATION AND TIME SLOTS

(71) Applicant: Comcast Cable Communications, LLC, Philadelphia, PA (US)

(72) Inventors: Gregory Allen Broome, Broomfield, CO (US); Jason Burgess, Highlands Ranch, CO (US); Richard Fliam, Greenwood Village, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/750,772

(22) Filed: Jan. 23, 2020

(65) Prior Publication Data

US 2020/0267234 A1 Aug. 20, 2020

Related U.S. Application Data

(63) Continuation of application No. 15/968,106, filed on May 1, 2018, now Pat. No. 10,587,723, which is a continuation of application No. 15/363,049, filed on Nov. 29, 2016, now Pat. No. 9,992,302, which is a continuation of application No. 14/808,622, filed on Jul. 24, 2015, now Pat. No. 9,560,161, which is a continuation of application No. 13/790,262, filed on Mar. 8, 2013, now Pat. No. 9,131,009.

(51) Int. Cl.
*H04L 29/08* (2006.01)
*H04N 21/472* (2011.01)
*H04N 21/2543* (2011.01)
*H04N 7/173* (2011.01)
*H04L 5/00* (2006.01)

(52) U.S. Cl.
CPC .......... *H04L 67/325* (2013.01); *H04L 5/0064* (2013.01); *H04L 67/32* (2013.01); *H04N 7/17318* (2013.01); *H04N 7/17336* (2013.01); *H04N 21/2543* (2013.01); *H04N 21/47202* (2013.01)

(58) Field of Classification Search
CPC ......... H04N 21/47202; H04N 21/2543; H04N 7/17318; H04N 7/17336; H04L 5/0064; H04L 67/32; H04L 67/325
See application file for complete search history.

(56) References Cited

U.S. PATENT DOCUMENTS

| | | | |
|---|---|---|---|
| 7,627,492 B2 | 12/2009 | Nishizawa et al. | |
| 9,560,161 B2 | 1/2017 | Broome et al. | |
| 2004/0146299 A1* | 7/2004 | Clapp | H04J 14/0227 398/49 |
| 2005/0198686 A1 | 9/2005 | Krause et al. | |

(Continued)

*Primary Examiner* — Mewale A Ambaye
(74) *Attorney, Agent, or Firm* — Banner & Witcoff, Ltd.

(57) ABSTRACT

A resource management system may use information regarding the bandwidth status of a downstream communication path to determine what portion of queued content should be sent in the current available bandwidth timeslot. In some embodiments, multiple versions of the same requested content may be available, and the system may select a lower-quality version to send if needed to meet a time deadline included in the original content request.

20 Claims, 6 Drawing Sheets

(56) References Cited

U.S. PATENT DOCUMENTS

| | | | | |
|---|---|---|---|---|
| 2007/0294422 | A1* | 12/2007 | Zuckerman | H04L 67/104 |
| | | | | 709/230 |
| 2008/0288977 | A1* | 11/2008 | Howcroft | H04N 21/64322 |
| | | | | 725/37 |
| 2008/0304520 | A1* | 12/2008 | Hannuksela | H04H 20/72 |
| | | | | 370/498 |
| 2009/0193485 | A1* | 7/2009 | Rieger | H04N 21/2385 |
| | | | | 725/114 |
| 2013/0060904 | A1 | 3/2013 | Ur | |
| 2013/0268984 | A1* | 10/2013 | Salinger | H04N 21/654 |
| | | | | 725/109 |

* cited by examiner

RESOURCE REQUEST MANAGEMENT USING BANDWIDTH ALLOCATION AND TIME SLOTS

CROSS REFERENCE TO RELATED APPLICATIONS

The present application is a continuation of and claims priority to U.S. patent application Ser. No. 15/968,106, filed May 1, 2018, which is a continuation of U.S. patent application Ser. No. 15/363,049, filed Nov. 29, 2016, which issued as U.S. Pat. No. 9,992,302, issued on Jun. 5, 2018, which is a continuation of U.S. patent application Ser. No. 14/808,622, filed Jul. 24, 2015, which issued as U.S. Pat. No. 9,560,161, issued Jan. 31, 2017, which is a continuation of U.S. patent application Ser. No. 13/790,262, filed Mar. 8, 2013, which issued as U.S. Pat. No. 9,131,009, issued Sep. 8, 2015, the disclosures of each of which are incorporated by reference herein in their entirety.

BACKGROUND

With the increase in network data traffic, the value of communication bandwidth is ever increasing. There is a persistent for managing networks need for managing networks to efficiently use and preserve bandwidth.

SUMMARY

The following summary is for illustrative purposes only, and is not intended to limit or constrain the detailed description.

In some embodiments, computing devices may send requests for content, such as requests for fragments of a video that the device is presenting for a user, to a content server. The request may identify the requested content as well as a time by which the content is needed, and the content server may use this information, along with information regarding current usage levels in a downstream bandwidth, to determine when to send the requested content to the client device.

In some embodiments, the content server may have multiple different versions of the same requested content, with each version having a different data size, and the content server may elect to send a different-sized version of the content in response to the reported downstream bandwidth usage levels. Sometimes, the content server may send a version that is of a lower quality than a requested quality, in order to ensure that the receiving device (e.g., a client) receives the requested content prior to the time needed. The selection of a version to send, and the selection of a content to send (when there are multiple items of contents waiting to be sent) may also be based on how much unused available bandwidth would remain if the content were sent. The content server may try to use as much of the available bandwidth as possible, sending the largest piece of waiting content that will fit, even if it was requested later in time than a smaller, waiting piece of content.

As noted above, this summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
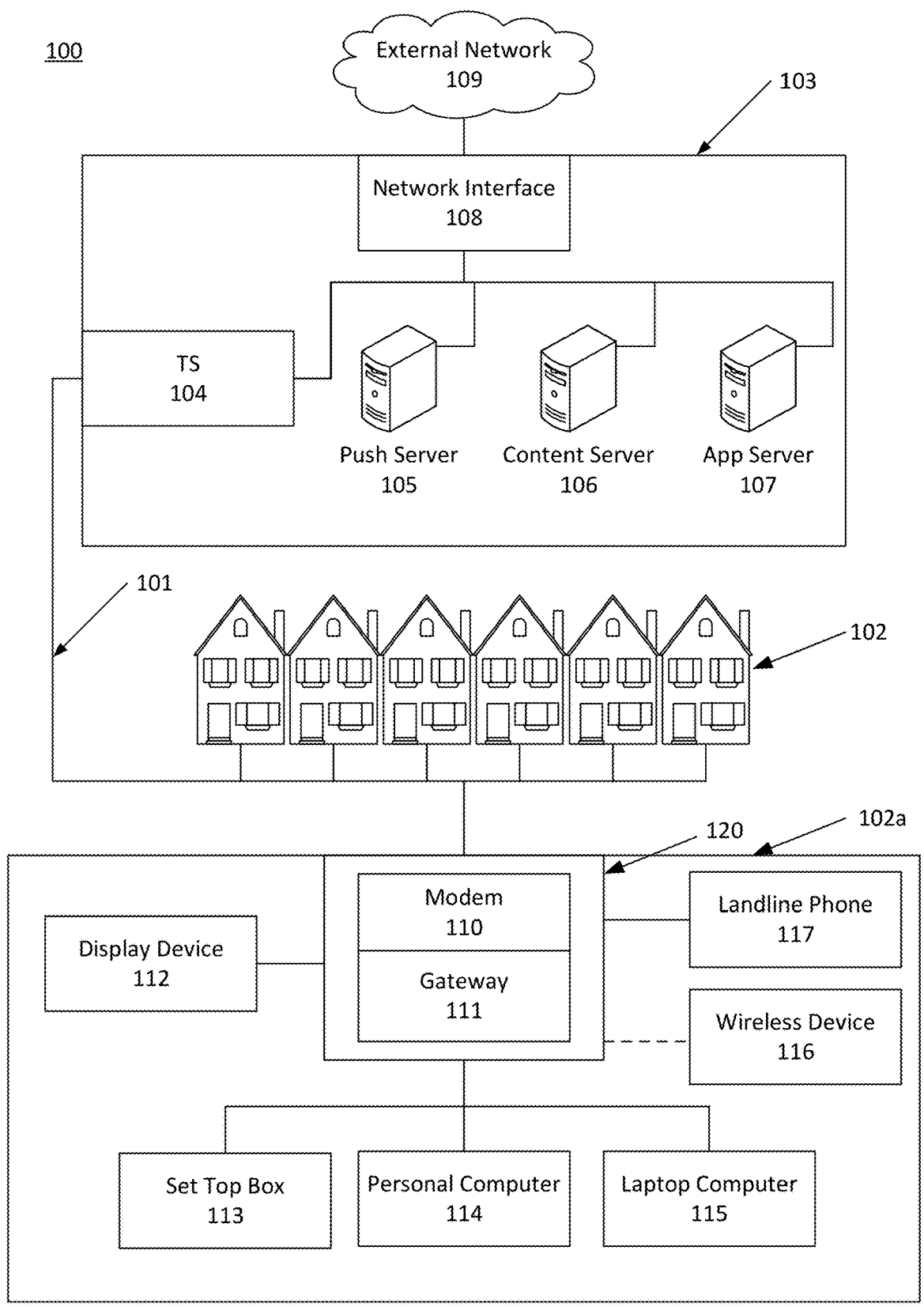
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs 112, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
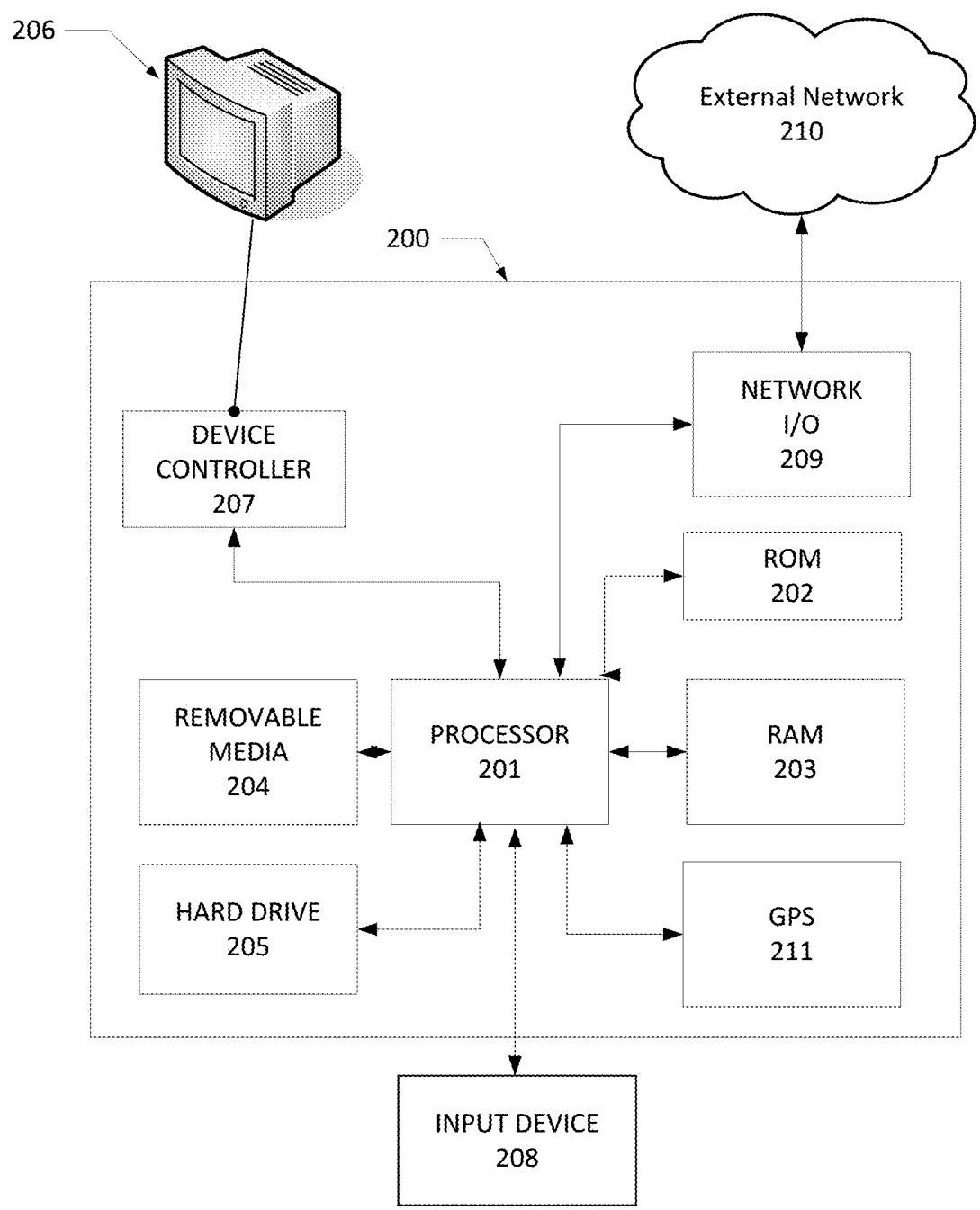
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
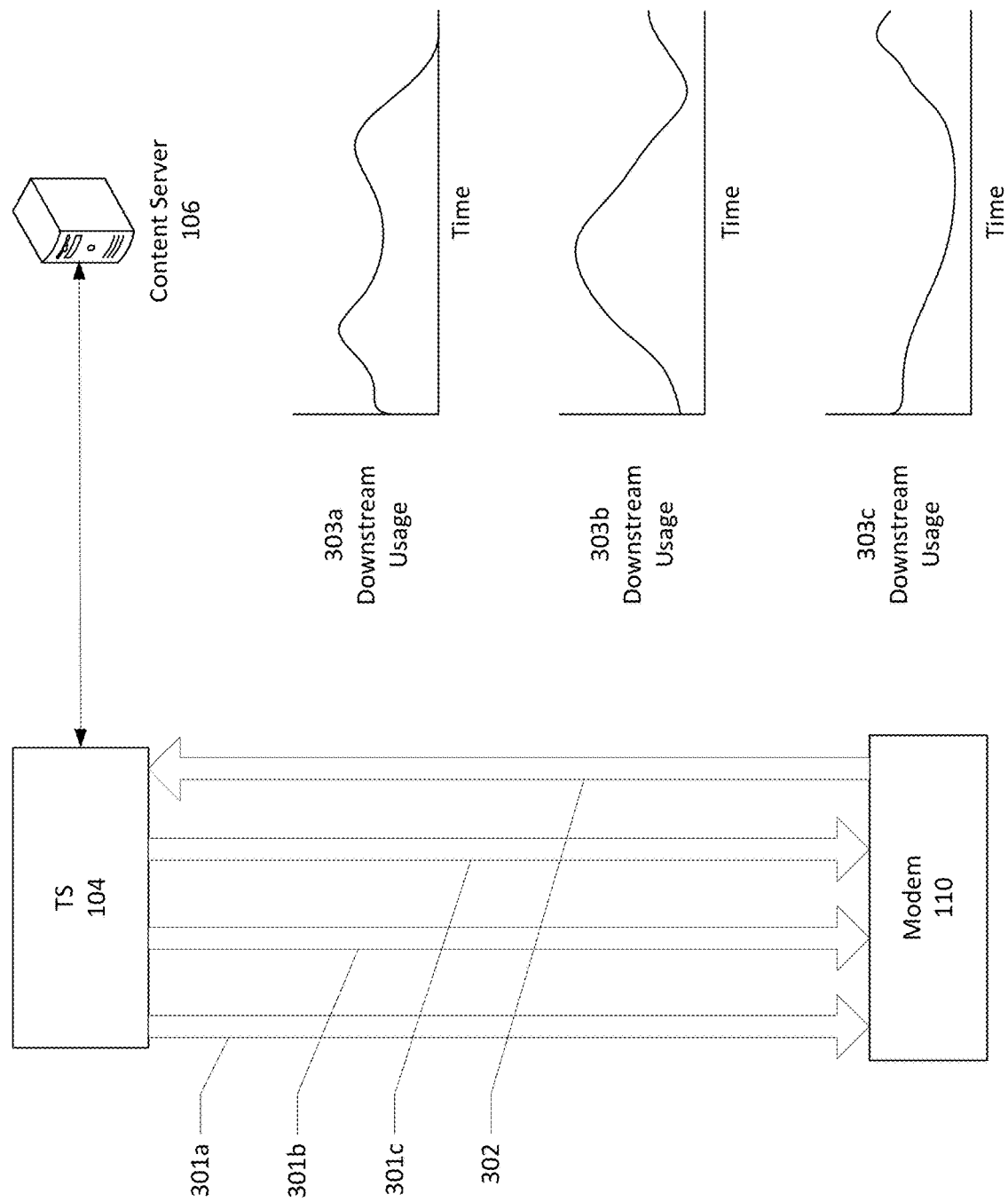
FIG. 3 illustrates a portion of the communication network shown in FIG. 1, with examples of network usage.

FIG. 3 illustrates an example portion of the network shown in FIG. 1. In particular, the communication link 101 between a termination server 104 and a corresponding access device, such as modem 110, may be comprised of a variety of sub-links 301-302. These sub-links may be logical and/or physical transmission channels or frequencies, such as DOCSIS downstream and upstream frequencies, bonded groups of frequencies, timeslot allocations on a shared channel, or any other desired transmission protocol. The termination server 104, in the example of an HFC network, may manage one or more quadrature amplitude modulation (QAM) transmitters for downstream channels 301a-c that may be used to deliver data from the termination server to the modem 110, while upstream channel 302 may be used to deliver data from the modem 110 to the termination server 104. Elements 301a-c may be any type of a communication path. In one example use scenario, a user may be using a tablet computing device to watch a streaming movie offered by a video delivery service. To obtain the movie, the user may use a browser on the tablet to connect to the user's modem 110, which may then forward a request to the termination server 104, requesting access to the video delivery service's listing of content and/or Internet portal. The termination server 104 may receive the request, and prepare a corresponding request to a content server 106 for the delivery service (e.g., an edge cache in a video content delivery network), via whatever intermediate network connections may be needed, and the content server 106 may respond by providing the requested listing and/or Internet portal page to the termination server 104, which may in turn provide this information to the modem 110 for eventual delivery to the user's tablet.

During streaming playback of the movie, the user's tablet might only receive an initial portion of the movie, and may periodically issue requests for more of the movie as they are needed. For example, the tablet may initially store, or buffer, the first minute of the movie, and it may then request additional fragments of the movie as they are needed. The fragments themselves may vary in size and/or playback duration, depending on the data compression used for the video and audio, and typical fragments may contain between 2 and 10 seconds of playback audiovisual data. For example, when the video content service adds a video program to its offerings, the service may process the video program to encode the various fragments that comprise the video program, and may assign them sequential numbers to indicate their order in the presentation of the program (e.g., fragment number 148). The service may store information identifying the location of these fragments, as well as their data size (e.g., 14 Mb).

In some embodiments, the service may generate different versions of the video program to accommodate different types of playback conditions. For example, the service may generate higher and/or lower resolution versions of the same fragments, such as a 1080p or 720p pixel resolution version in addition to a standard definition version and a reduced-size version for smart phones, and a version with 7.1 stereo audio in addition to a version with basic two-channel stereo audio. These different versions may be used to accommodate different playback devices (e.g., smart phones, tablets, personal computers, standard-definition televisions and high-definition televisions), and to also accommodate different amounts of available bandwidth.

The video delivery service may share the downstream bandwidth 301a-c with a variety of other services, and the overall usage may vary over time, as illustrated in the graphs 303a-c. This variation may change the amount of available unused bandwidth, and embodiments described herein may account for this variance in available bandwidth, and adjust its delivery of content to optimize the usage of the available bandwidth. As will be described further below, in some embodiments, the content server 106 may intentionally delay and/or reorder the delivery of content fragments to best use the available bandwidth. Further, since the available bandwidth may also fluctuate, embodiments herein may receive bandwidth usage reports from the termination server 104, and use the reports to identify how much bandwidth is available.

Figure 4:
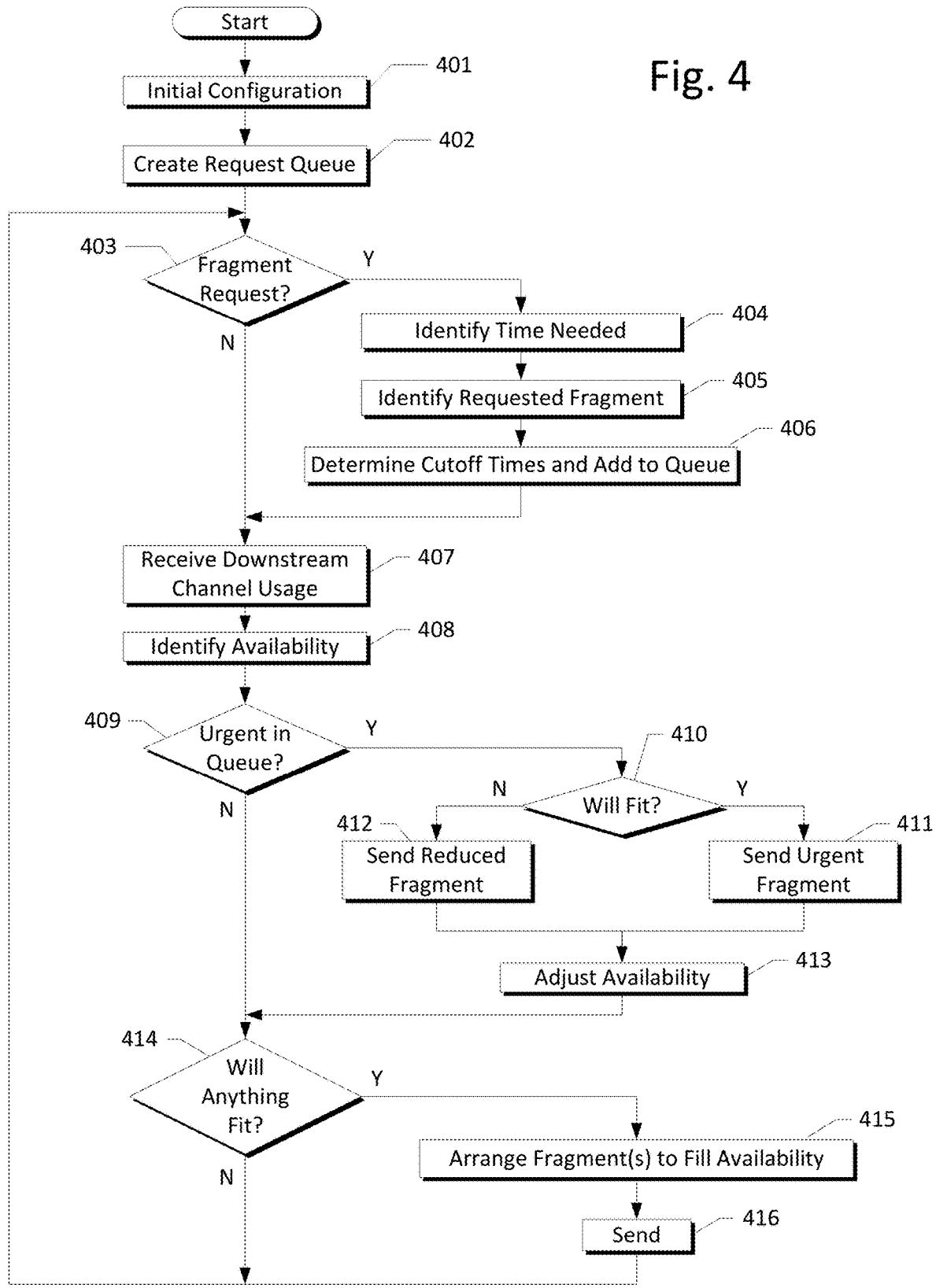
FIG. 4 illustrates an example process of managing requests.

FIG. 4 illustrates an example process for managing bandwidth usage. The process may be performed by a computing device, e.g., the content server 106, upon execution of corresponding instructions stored on a computer-readable medium, such as hard drive 205 and/or RAM 203, and may begin in step 401 with the initial configuration. The initial configuration may include establishing the downstream communication paths, or channels 301a-c that will be used by the content serer 106. This may include identifying the initial user request for a streaming session, identification of the source and destination addresses for the session, and any other desired configuration detail to establish the downstream communication.

The initial configuration may also include establishing an upstream communication path, or channel 302, which the modem 110 may use to transmit content requests and status messages to the termination server 104. The initial configuration may also include establishing a channel through which the termination server 104 can communicate with the content server 106.

In step 402, the content server 106 may create a request queue. The request queue may be a data structure that is used to identify the pieces of content that have been requested by the various devices in the system. For example, the queue may identify the various video fragments by their file name (e.g., "Movie #12342, fragment 343523"), and also identify the requesting device (e.g., by its Media Access Control (MAC) address, or its Internet Protocol (IP) address, or by any other desired identification) and the time by which the requested fragment is needed (e.g., Monday, December 10, 4:13:03 pm, or epoch time 1355174028).

In step 403, the content server 106 may determine whether an incoming request for a content fragment has been received from a requesting client device, such as a user's tablet computer or the user's gateway or modem. The request itself may be formatted as an IP packet, and may contain information identifying the requesting device, the requested content, and the time the content is needed. If such a request has been received, then in step 404, the content server 106 may begin to extract information from the request. In step 404, the content server 106 may identify the time by which the fragment is needed. As noted above, the time may indicate a time of day, which may indicate the time when the requesting device will finish playback of the portions of the program that it has already received. Alternatively, the requesting device may factor into account delay due to reception, decoding and processing delays, and the time needed value may indicate the point at which the requesting device wishes to have the next fragment, so that it may finish decoding it in time for display to the user.

In step 405, the content server 106 may identify the requested fragment, based on the content identification contained in the request. The content identification may identify the content fragment by identifying, for example, the program or content item to which the fragment belongs, and the playback point in time of the needed fragment. For example, the content identification may indicate that the requesting device needs the next portion of the high-definition (HD) version of the movie "The Dark Knight Rises," beginning at 20 minutes, 10 seconds into the movie. Instead of listing the playback time of the requested fragment, the request may alternatively simply indicate the last fragment number (e.g., fragment 2352) in the requesting device's buffer, and the content server 106 may respond by looking for the next fragment after the one identified in the request.

As part of identifying the next fragment, the content server 106 may actually identify multiple versions of the fragment, as noted above. So, for a given portion of the video program, the content server may have a first fragment encoded at a standard video definition (e.g., 486 lines per frame), a second fragment encoded at a high-definition (e.g., 1080 lines per frame), and a third fragment encoded at a low resolution (e.g., 300 lines per frame). In the step 405 identification, the content server may identify all of these variant fragments as possibilities for responding to the request. If the request identified a specific version (e.g., high-definition), then the content server 106 may also identify the one that was requested by the user.

In step 406, for each of the identified fragments, the content server 106 may determine, based on the data transmission rate of the downstream channels 301a-c and the data size of the fragment, a cutoff time by which the transmission of the fragment needs to begin in order to arrive on or before the "time needed" indicated in the request. For example, if the data rate is 300 Mb/sec, and the HD fragment is a 300 Mb file, then the content server 106 may determine in step 406 that the fragment needs to be sent one second before the time needed in the request. Additional time (e.g., another second) may also be added to account for processing delay. Information identifying the time needed, fragment requested, alternative fragments and cutoff times may be stored by the content server 106 in the data queue discussed above.

In step 407, the content server 106 may receive a message from the termination server 104, identifying the current bandwidth usage levels for the one or more downstream channels 301a-c. For example, in an HFC-type network, the termination server 104 may indicate the number of QAM channels that are available for the video service to use, and the amount of space on the channels that is available in a current time slot (or slots, or future time slots) being prepared by the termination server 104. Alternatively, the bandwidth usage level may indicate an amount of the available bandwidth on a communication path or channel that is already consumed. Over time, the bandwidth usage may resemble that depicted in FIG. 5a. As illustrated, the bandwidth usage for a given channel (e.g., channel 301a) may vary over sequential time slots, remaining under a limit 501, which may be a limit of the channel 301a and/or a limit imposed on the service. The illustration also includes two requested fragments Q1,Q2 in the queue, awaiting transmission, with the sizes representative of the bandwidth needed for their transmission. The content server 106 may continuously, or periodically, receive these messages from the termination server 104. The loop shown in FIG. 4 may also skip this step in situations where a bandwidth update has not been sent by the termination server 104.

Figure 5A:
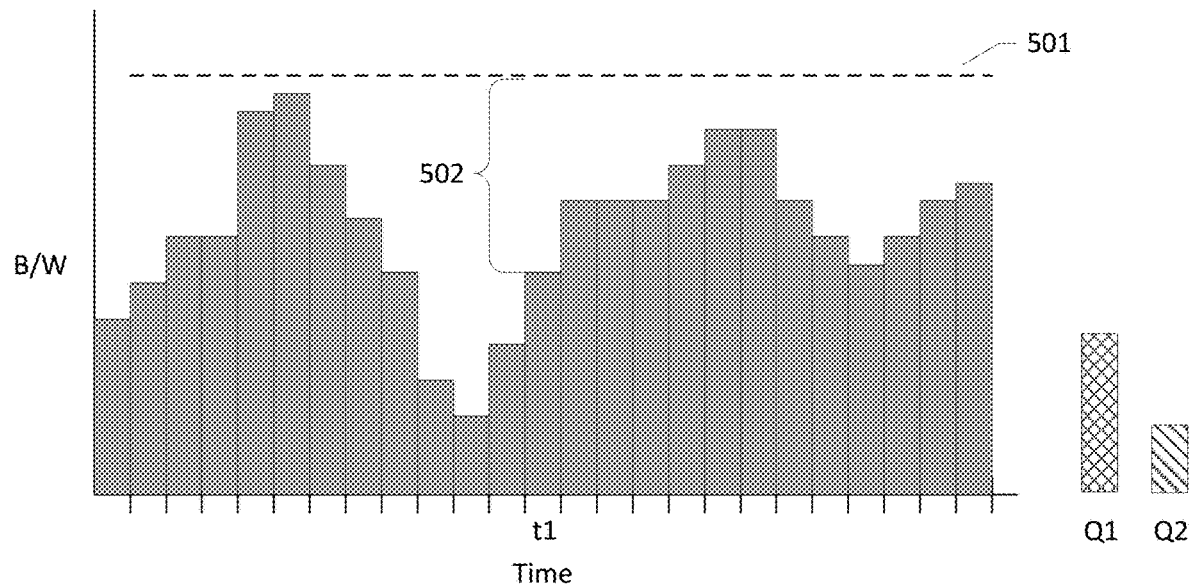
FIGS. 5*a-d* illustrate example bandwidth usages.

In step 408, the content server 106 may determine what future bandwidth availability currently exists (e.g., has not been scheduled for use). Referring to FIG. 5a, if the current bandwidth message is received for time t1, then the available bandwidth 502 may be used by the service.

In step 409, the content server 106 may determine whether there are any urgent fragments awaiting transmission in the queue. A fragment may be deemed urgent if the current time has reached the cutoff time for a requested fragment. If there are any urgent fragments in the queue, then in step 410, the content server 106 may consult the stored information identifying the available bandwidth (from step 407), and the stored information identifying the requested fragments and their variants (from step 405) and determine how best to fit all of the urgent fragments in the currently available bandwidth. Assuming that the requested urgent fragments will fit in the currently available bandwidth, then in step 411, those urgent fragments will be sent from the content server 106 to the termination server 104 for delivery to the requesting device.

However, if the available bandwidth is insufficient to fit the urgent fragment(s), then in step 412, the content server 106 may identify reduced-sized versions of the requested fragment(s), and send the reduced-sized or reduced-quality version(s) to the termination server 104 for delivery to the requesting device. The selection of the reduced-sized version may involve selecting the largest version that will fit in the available bandwidth. If there is insufficient bandwidth for even the smallest version of the requested fragment, then the content server can skip the requested fragment for now, and await the next bandwidth opportunity to send it.

In step 413, the content server 106 may adjust its own stored information identifying the available bandwidth, to account for any fragments sent in steps 411 or 412, so that the bandwidth information is up-to-date for further use, and in case step 409 is encountered again before an updated bandwidth message is received from the termination server 104.

Figure 5B:
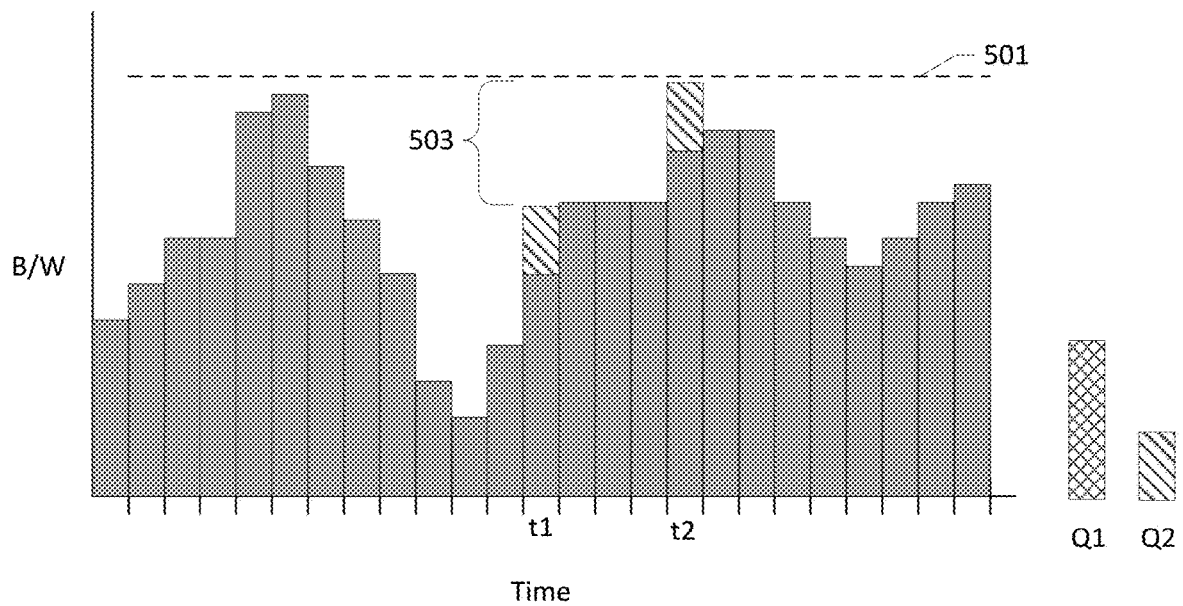

In step 414, the content server 106 may then check to determine if anything remaining in the queue will fit in the currently-available bandwidth. If there is enough room, then in step 415, the content server 106 may send one or more fragments from the queue to maximize the usage of the currently-available bandwidth. To maximize this usage, the content server 106 may seek to use as much of the available bandwidth as possible. Referring to FIG. 5*b*, if Q2 were the only fragment awaiting transmission, then during the time slot t1 there will be an amount of unused bandwidth 503 in that time slot. If the same fragment were sent in time t2 instead, there would be virtually no unused bandwidth, so sending the Q2 fragment at time t2 would better maximize the use of the bandwidth.

Figure 5C:
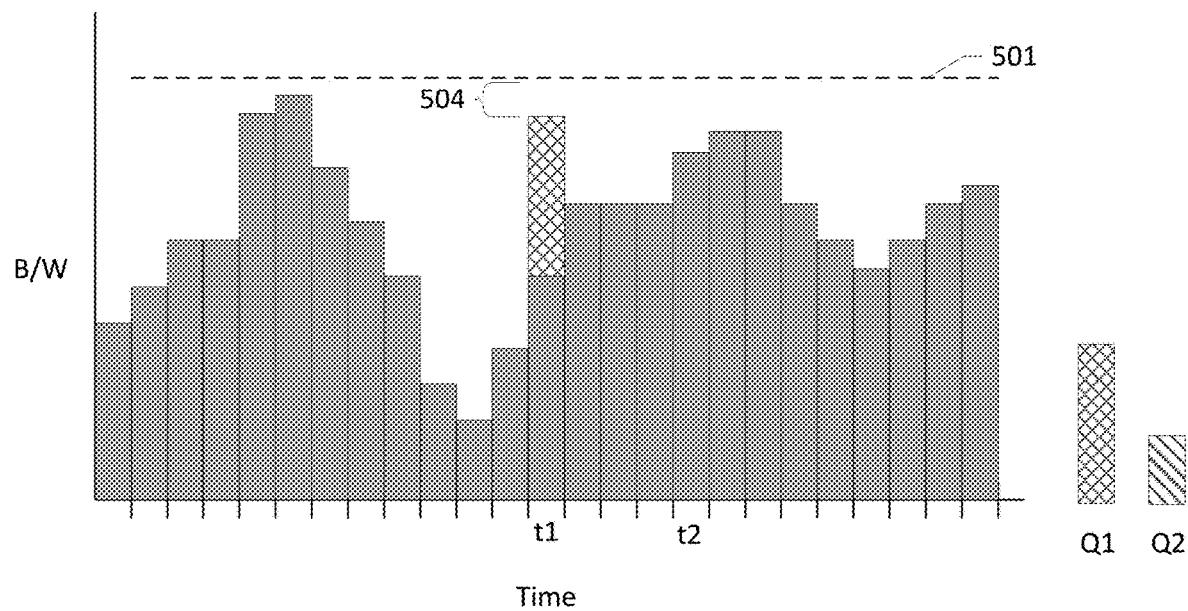

Of course, at time t1, the content server 106 might not know that a better slot will be coming up in time t2. In such embodiments, if Q2 were the only fragment awaiting transmission, then the content server 106 may simply send that fragment in time t1. However, if multiple fragments are awaiting transmission at time t1, then the content server 106 may seek to send the largest fragment that will still fit in the available bandwidth. So for example, referring to FIG. 5*c*, the fragment Q1 is shown as using up more of the available bandwidth at time t1, leaving unused space 504 that would be smaller than the space 503 that would remain if Q2 were sent instead. To fill this space, the content server 106 may enter into a recursive algorithm, filling the available space with the largest fragment that will fit, reducing the amount of available space accordingly, and then repeating the process until no more awaiting fragments will fit in whatever space remains.

However, if at time t1, the content server 106 has information for a plurality of future time slots (e.g., if the message in step 407 provided information for a plurality of future time slots on the downstream channels 301*a-c*), then the content server 106 could schedule the Q1 fragment for transmission in time t1, and the Q2 fragment for transmission in time t2. The content server 106 can use the same approach discussed above—find the largest waiting fragment that will fit in an available slot, and repeat until no more waiting fragments can fit.

When the content server 106 has finished arranging the fragment(s) to fill the available bandwidth, then in step 416, the content server 106 may transmit the fragment(s) to the termination server 104 for delivery to the requesting devices. From there, the process may return to step 403, and can repeat as long as desired.

The example process above shows a degree of urgency in step 409, and gives those fragments priority in filling available space. In some embodiments, multiple degrees of urgency may be defined. For example, a fragment may be deemed "urgent" if the current time is at or beyond the time needed value identified in the client request. Another degree of urgency (e.g., "less than urgent") may be defined if the current time is within 5 seconds (or any other desired time window) of the time needed, and those "less than urgent" fragments may be given the next opportunity after step 413. In such embodiments, after step 413, another set of steps similar to steps 409-413 may be used for the "less than urgent" fragments. There may be many such degrees of urgency, each with a different time window preceding the time needed, and each classification of fragment may await its turn for consuming the current time slot(s) being filled.

Figure 5D:
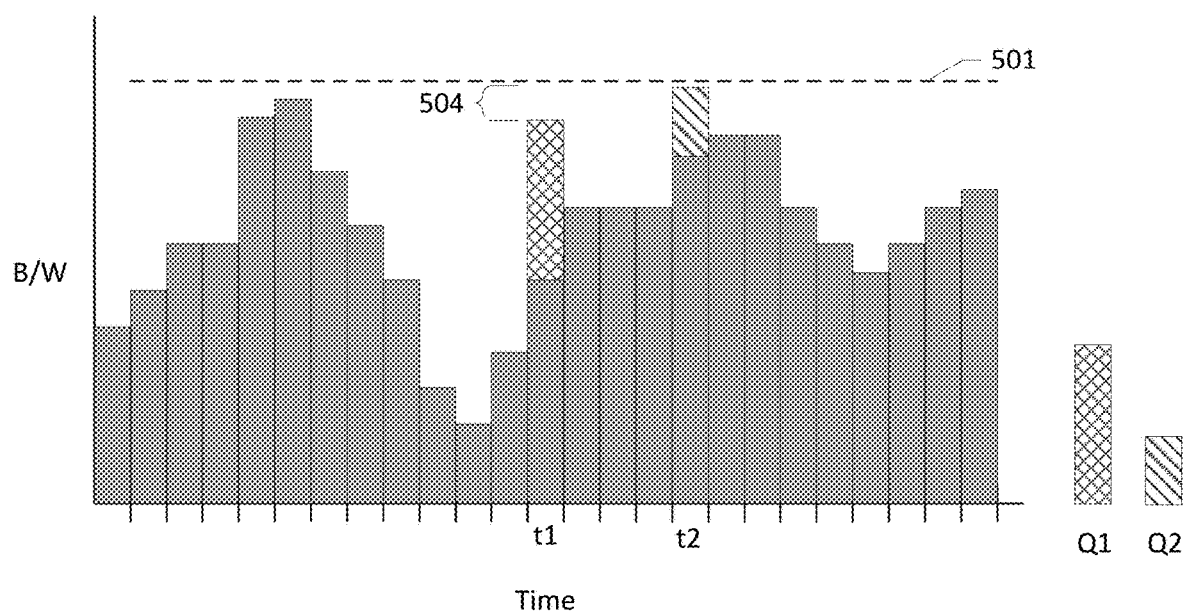

The example process above handles urgent fragments first, and then arranges whatever less urgent additional fragments will fit in the remaining available bandwidth. In alternate embodiments, the urgent fragments may also be arranged to maximize the usage of the available bandwidth. For example, if multiple time slots are available as shown in FIG. 5*b*, and if Q2 were urgent, then the content server 106 may elect to place the Q2 fragment in the t2 slot, since that will result in less unused bandwidth. This may be acceptable under the condition that delivery of the Q2 fragment at time t2 to the requesting client will still be within the time needed indicated in the client's request. This may also be true, even if the request for Q2 was made before the request for Q1—the content server 106 may rearrange the fragments so that they are not sent in the same order in which their respective requests were received. Such a usage is illustrated in FIG. 5*d*.

In some embodiments, the fragment requests 403 can be sent in response to a user who has changed a playback speed of a streaming video. For example, a user may be watching a streaming movie, and decide to press the fast-forward button on his/her remote control. In response to that press, the user's client device (e.g., a DVR or tablet) may transmit a new fragment request 403, identifying a new fragment that is needed, and indicating that previous unfilled requests are no longer needed. The content server may update its schedule to remove the unfilled requests, and add the new fragment request. In embodiments where the user may indicate a new playback point (e.g., by requesting to jump ahead in the program by 30 seconds), the user's client device may transmit a new fragment request for the new playback point, and prior unfilled requests for the user may be discarded by the content server. If the new playback point is one for which the client has already sent a request (e.g., if the client was trying to keep a 45-second buffer of content ahead of the current playback point, then the fragment that is 30 seconds ahead may have already been the subject of an earlier request), then the content server may respond by escalating the priority of that requested fragment, and its subsequent fragments, to reflect the jumping ahead. In this manner, an upstream signaling from the client to the server may indicate the client's current playback status, and that upstream signaling may be used by the content server to manage its downstream bandwidth allocation.

Although example embodiments are described above, the various features and steps may be combined, divided, omitted, and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
   receiving, by a computing device and from a user device, a request for a plurality of content fragments associated with a content item, wherein the computing device is allocated an amount of bandwidth available for a plurality of time slots;
   receiving, from the user device, an indication of a video quality associated with the content item;
   determining, based on the indication, a time slot, of the plurality of time slots, for transmission of one or more of the plurality of content fragments; and
   sending, to the user device, the one or more of the plurality of content fragments in the determined time slot.

2. The method of claim 1, further comprising receiving, from the user device, an indication of a playback speed associated with the content item, and wherein the determining the time slot is further based on the indication of the playback speed.

3. The method of claim 1, further comprising receiving, from the user device, an indication of a new playback point of the content item, and wherein the determining the time slot is further based on the indication of the new playback point.

4. The method of claim 1, further comprising:
escalating, based on the indication, a priority of the one or more of the plurality of content fragments.

5. The method of claim 1, further comprising:
discarding, based on the indication, a subset of the plurality of content fragments.

6. The method of claim 1, further comprising:
determining which of the plurality of content fragments, if sent to the user device, would result in a smallest remaining available bandwidth for each of the plurality of time slots.

7. The method of claim 1, wherein the sending is based on a data transmission rate for sending data to the user device.

8. A computing device comprising:
one or more processors; and
memory storing computer-readable instructions that, when executed by the one or more processors, cause the computing device to:
receive, from a user device, a request for a plurality of content fragments associated with a content item, wherein the computing device is allocated an amount of bandwidth available for a plurality of time slots;
receive, from the user device, an indication of a video quality associated with the content item;
determine, based on the indication, a time slot, of the plurality of time slots, for transmission of one or more of the plurality of content fragments; and
send, to the user device, the one or more of the plurality of content fragments in the determined time slot.

9. The computing device of claim 8, wherein the computer-readable instructions, when executed by the one or more processors, further cause the computing device to receive, from the user device, an indication of a playback speed associated with the content item, and
wherein the computer-readable instructions, when executed by the one or more processors, cause the computing device to determine the time slot further based on the indication of the playback speed.

10. The computing device of claim 8, wherein the computer-readable instructions, when executed by the one or more processors, further cause the computing device to receive, from the user device, an indication of a new playback point of the content item, and
wherein the computer-readable instructions, when executed by the one or more processors, cause the computing device to determine the time slot further based on the indication of the new playback point.

11. The computing device of claim 8, wherein the computer-readable instructions, when executed by the one or more processors, further cause the computing device to escalate, based on the indication, a priority of the one or more of the plurality of content fragments.

12. The computing device of claim 8, wherein the computer-readable instructions, when executed by the one or more processors, further cause the computing device to discard, based on the indication, a subset of the plurality of content fragments.

13. The computing device of claim 8, wherein the computer-readable instructions, when executed by the one or more processors, further cause the computing device to determine which of the plurality of content fragments, if sent to the user device, would result in a smallest remaining available bandwidth for each of the plurality of time slots.

14. The computing device of claim 8, wherein the computer-readable instructions, when executed by the one or more processors, cause the computing device to send the one or more of the plurality of content fragments based on a data transmission rate for sending data to the user device.

15. A system comprising:
a computing device having an amount of bandwidth available for a plurality of time slots; and
a user device configured to:
send, to the computing device, a request for a plurality of content fragments associated with a content item; and
send, to the computing device, an indication of a video quality associated with the content item,
wherein the computing device is configured to:
determine, based on the indication, a time slot, of the plurality of time slots for transmission of one or more of the plurality of content fragments; and
send, to the user device, the one or more of the plurality of content fragments in the determined time slot.

16. The system of claim 15, wherein the user device is further configured to send, to the computing device, an indication of a playback speed associated with the content item, and
wherein the computing device is configured to determine the time slot further based on the indication of the playback speed.

17. The system of claim 15, wherein the user device is further configured to send, to the computing device, an indication of a new playback point of the content item, and
wherein the computing device is configured to determine the time slot further based on the indication of the new playback point.

18. The system of claim 15, wherein the computing device is further configured to escalate, based on the indication, a priority of the one or more of the plurality of content fragments.

19. The system of claim 15, wherein the computing device is further configured to discard, based on the indication, a subset of the plurality of content fragments.

20. The system of claim 15, wherein the computing device is further configured to determine Which of the plurality of content fragments, if sent to the user device, would result in a smallest remaining available bandwidth for each of the plurality of time slots.

* * * * *

UNITED STATES PATENT AND TRADEMARK OFFICE
CERTIFICATE OF CORRECTION

| | |
|---|---|
| PATENT NO. | : 10,958,759 B2 |
| APPLICATION NO. | : 16/750772 |
| DATED | : March 23, 2021 |
| INVENTOR(S) | : Broome et al. |

It is certified that error appears in the above-identified patent and that said Letters Patent is hereby corrected as shown below:

In the Specification

Column 4, Detailed Description, Line 11:
Delete "112," and insert --113,-- therefor Column 6, Detailed Description, Line 53:
Delete "serer" and insert --server-- therefor In the Claims Column 12, Claim 15, Line 30:
After "slots", insert --,-- therefor Column 12, Claim 20, Line 55:
Delete "Which" and insert --which-- therefor Signed and Sealed this
Twenty-seventh Day of February, 2024

Katherine Kelly Vidal
*Director of the United States Patent and Trademark Office*